(12) United States Patent
Schoenau et al.

(10) Patent No.: US 8,074,945 B2
(45) Date of Patent: Dec. 13, 2011

(54) CONDUIT MOUNTING SYSTEM

(75) Inventors: William Thomas Schoenau, Washington, IL (US); Gene Ray Slinkard, Pontiac, IL (US); Travis James King, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 226 days.

(21) Appl. No.: 12/314,670

(22) Filed: Dec. 15, 2008

(65) Prior Publication Data
US 2010/0148018 A1    Jun. 17, 2010

(51) Int. Cl.
*F16L 3/08*    (2006.01)

(52) U.S. Cl. ......... 248/74.4; 248/67.7; 248/68.1; 248/73; 248/65; 248/49; 248/62; 248/74.1; 248/61; 248/316.6; 248/67.5

(58) Field of Classification Search ........... 248/67.7, 248/68.1, 73, 74.4, 65, 49, 62, 74.1, 61, 316.6, 248/67.5, 74.3
See application file for complete search history.

(56) References Cited

U.S. PATENT DOCUMENTS

| | | | | |
|---|---|---|---|---|
| 1,133,976 A | * | 3/1915 | Kraus | 248/68.1 |
| 1,761,075 A | | 6/1930 | Gest | |
| 2,417,260 A | * | 3/1947 | Morehouse | 174/135 |
| 2,937,835 A | * | 5/1960 | Csmereka | 248/74.4 |
| 3,186,051 A | * | 6/1965 | Waddell | 403/391 |
| 3,188,030 A | * | 6/1965 | Fischer | 248/68.1 |
| 3,205,611 A | | 9/1965 | Onanian | |
| 3,216,683 A | * | 11/1965 | Girard | 248/68.1 |
| 3,464,661 A | * | 9/1969 | Alesi, Jr. | 248/68.1 |
| 3,523,667 A | * | 8/1970 | Guerrero | 248/49 |
| 3,526,934 A | * | 9/1970 | Owen, Sr. | 285/154.1 |
| 3,592,427 A | * | 7/1971 | Misuraca | 248/68.1 |
| 3,693,664 A | * | 9/1972 | Schmunk | 138/111 |
| 3,856,246 A | * | 12/1974 | Sinko | 248/68.1 |
| 4,003,144 A | * | 1/1977 | Maddestra et al. | 434/403 |
| 4,062,569 A | | 12/1977 | Kay | |
| 4,099,626 A | * | 7/1978 | Magnussen, Jr. | 211/60.1 |
| 4,199,070 A | * | 4/1980 | Magnussen, Jr. | 211/60.1 |
| 4,202,520 A | * | 5/1980 | Loos et al. | 248/68.1 |
| 4,215,880 A | * | 8/1980 | Trittipoe | 285/61 |
| 4,244,542 A | * | 1/1981 | Mathews | 248/49 |
| 4,247,133 A | | 1/1981 | Moller | |
| 4,306,697 A | * | 12/1981 | Mathews | 248/68.1 |
| 4,410,095 A | * | 10/1983 | Dembicks | 211/70.6 |
| 4,442,990 A | * | 4/1984 | Krueger | 248/62 |
| 4,618,114 A | * | 10/1986 | McFarland | 248/65 |
| 4,767,086 A | * | 8/1988 | Blomqvist | 248/56 |
| 5,188,319 A | * | 2/1993 | Hawash et al. | 248/68.1 |

(Continued)

*Primary Examiner* — Nkeisha Smith
(74) *Attorney, Agent, or Firm* — Finnegan, Henderson, Farabow, Garrett & Dunner LLP

(57) ABSTRACT

A conduit mounting system includes a plurality of modular components. Each modular component includes first and second transverse sides that are spaced apart and substantially parallel with one another and third and fourth longitudinal sides that are spaced apart and substantially parallel with one another. The third and fourth longitudinal sides extend between the first and second sides. Each modular component also includes a fifth side disposed between the first and second sides and between the third and fourth sides. The fifth side includes a conduit support surface disposed between first and second side contact portions. Each modular component also includes a flange having a first flange portion extending beyond a surface of the third side and a second flange portion extending beyond a surface of the first side contact portion of the fifth side. Each modular component further includes a groove having a first groove portion formed in the fourth side and a second groove portion formed in the second side portion.

19 Claims, 3 Drawing Sheets

U.S. PATENT DOCUMENTS

| | | | | |
|---|---|---|---|---|
| 5,234,185 A | * | 8/1993 | Hoffman et al. | 248/56 |
| 5,344,143 A | | 9/1994 | Yule | |
| 5,377,939 A | * | 1/1995 | Kirma | 248/68.1 |
| 5,451,177 A | * | 9/1995 | Gilman | 446/128 |
| 5,794,897 A | * | 8/1998 | Jobin et al. | 248/74.4 |
| 5,992,802 A | * | 11/1999 | Campbell | 248/68.1 |
| 5,996,945 A | * | 12/1999 | Coles et al. | 248/68.1 |
| 6,079,673 A | * | 6/2000 | Cox | 248/63 |
| 6,308,921 B1 | * | 10/2001 | Borzucki | 248/68.1 |
| 6,378,811 B1 | * | 4/2002 | Potter et al. | 248/68.1 |
| 6,561,466 B1 | * | 5/2003 | Myers et al. | 248/74.4 |
| 6,715,247 B1 | * | 4/2004 | Sanftleben et al. | 52/220.8 |
| 6,783,101 B2 | * | 8/2004 | Knotts | 248/68.1 |
| 6,889,944 B2 | * | 5/2005 | Brandzel et al. | 248/68.1 |
| 6,968,864 B2 | * | 11/2005 | Miyamoto et al. | 138/110 |
| 7,175,138 B2 | * | 2/2007 | Low et al. | 248/68.1 |
| 7,380,754 B2 | | 6/2008 | James et al. | |
| 2009/0224111 A1 | * | 9/2009 | Gilbreath | 248/68.1 |

* cited by examiner

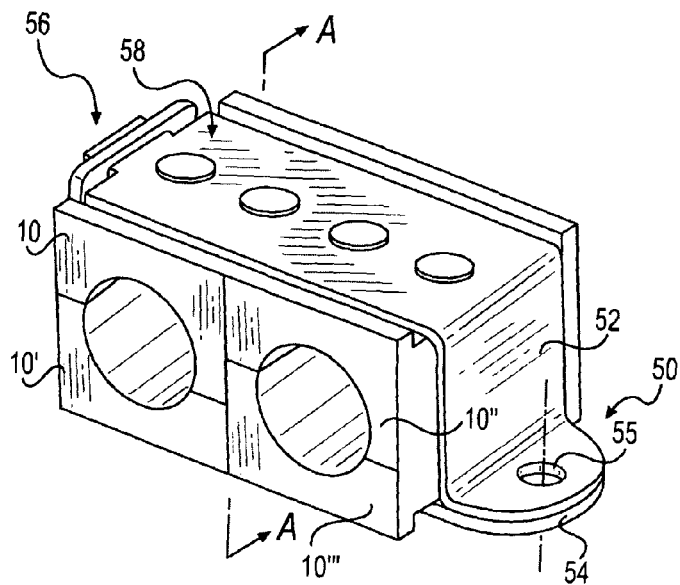
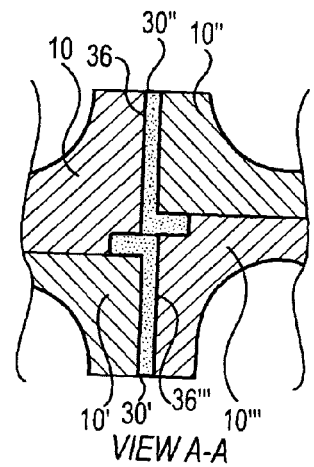
FIG. 3a
FIG. 3b
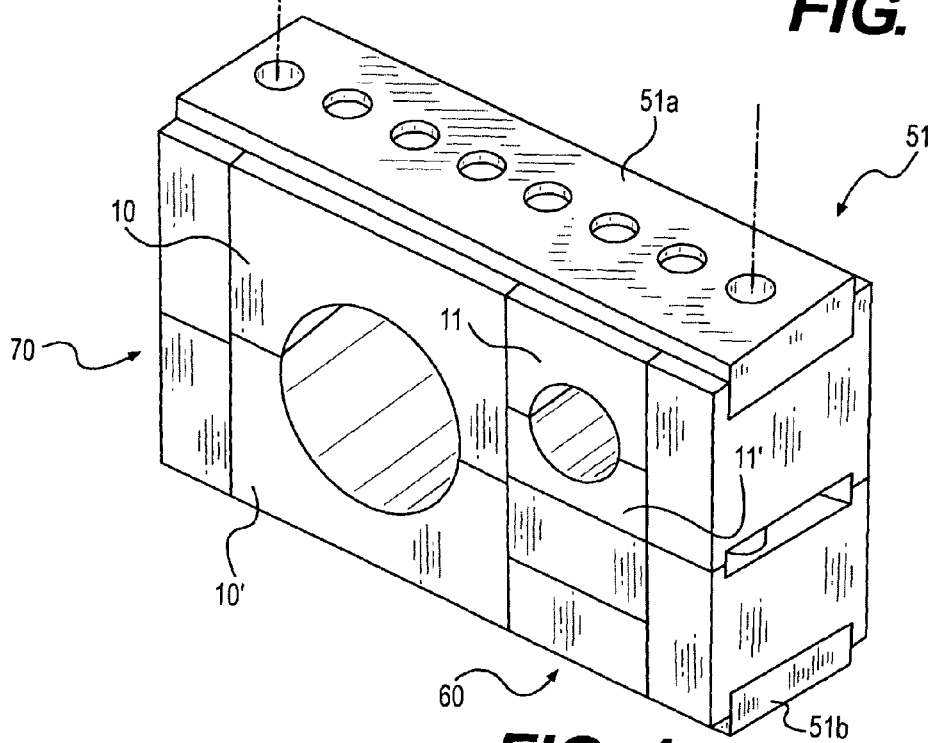
FIG. 4

CONDUIT MOUNTING SYSTEM

TECHNICAL FIELD

The present disclosure relates to a mounting system and, more particularly, to a method and apparatus for mounting conduit.

BACKGROUND

Typically conduits, for example, hoses, pipes, or wires, are mounted to fixed or movable structural elements. For example, hydraulic hoses may be mounted to movable components of a machine frame or electrical wires may be mounted to a fixed wall of a building. Conduit mounting systems often include a plurality of modular elements interconnected with one another and forming openings for supporting a conduit relative to additional conduits and to the structural element. Utilizing modular components reduces the number of different parts associated with a mounting system. However, the number and/or type of conduits that a particular modular mounting system may accommodate may be reduced as compared to a customized mounting system.

U.S. Pat. No. 6,561,466 ("the '466 patent") issued to Myers et al. discloses an interchangeable hose, cable, and conduit support mechanism. The mechanism includes a pair of substantially identical covers interconnected and forming a first cavity adapted to retain a pair of substantially identical inserts. The pair of inserts form a second cavity that is adapted to retain a conduit. Each cover respectively includes an extension and a receptacle to interlock a pair of covers together. The extension of a first cover is configured to extend into the receptacle of a second cover and the extension of the second cover is configured to extend into the receptacle of the first cover. Each insert respectively includes an extension and a receptacle to interlock a pair of inserts together. The extension of a first insert is configured to extend into the receptacle of a second insert and the extension of the second insert is configured to extend into the receptacle of the first insert.

SUMMARY

In one aspect, the present disclosure is directed to a conduit mounting system including a plurality of modular components. Each modular component includes first and second transverse sides that are spaced apart and substantially parallel with one another and third and fourth longitudinal sides that are spaced apart and substantially parallel with one another. The third and fourth longitudinal sides extend between the first and second sides. Each modular component also includes a fifth side disposed between the first and second sides and between the third and fourth sides. The fifth side includes a conduit support surface disposed between first and second side contact portions. Each modular component also includes a flange having a first flange portion extending beyond a surface of the third side and a second flange portion extending beyond a surface of the first side contact portion of the fifth side. Each modular component further includes a groove having a first groove portion formed in the fourth side and a second groove portion formed in the second side portion.

In another aspect, the present disclosure is directed to a conduit mounting system. The system includes a first modular component having first and second sides axially separated and substantially parallel with one another. The first modular component also includes third and fourth sides disposed between the first and second sides and being axially separated and substantially parallel with one another. The first modular component also includes a fifth side disposed between the first, second, third, and fourth sides and having a conduit support surface disposed therein between first and second contact surfaces. The first modular component also includes a flange, extending beyond a surface of the third side and a surface of the fifth side, and a groove, formed within the fourth side and the fifth side. The system also includes a second modular component substantially similar to the first modular component. The second modular component is disposed adjacent the first modular component such that at least a portion of the flange of the first modular component is disposed at least partially within the groove of the second modular component. Additionally, the first and second contact surfaces of the fifth side of the first modular component respectively engage the second and first contact surfaces of the fifth side of the second modular component. The system further includes a first channel formed between the first and second modular components. The first channel is defined by the conduit support surface disposed in the fifth side of the first modular component and the support surface disposed in the fifth side of the second modular component.

BRIEF DESCRIPTION OF THE DRAWINGS

FIG. 3a is a diagrammatic illustration of an exemplary conduit mounting system including four exemplary modular components of FIG. 1;

FIG. 3b is a cross sectional illustration along view A-A of FIG. 3a;

FIG. 4 is a diagrammatic illustration of an exemplary conduit mounting system including four exemplary modular components of FIG. 1;

FIG. 5b is another diagrammatic illustration of the spacer of FIG. 5a; and

DETAILED DESCRIPTION

Figure 1:
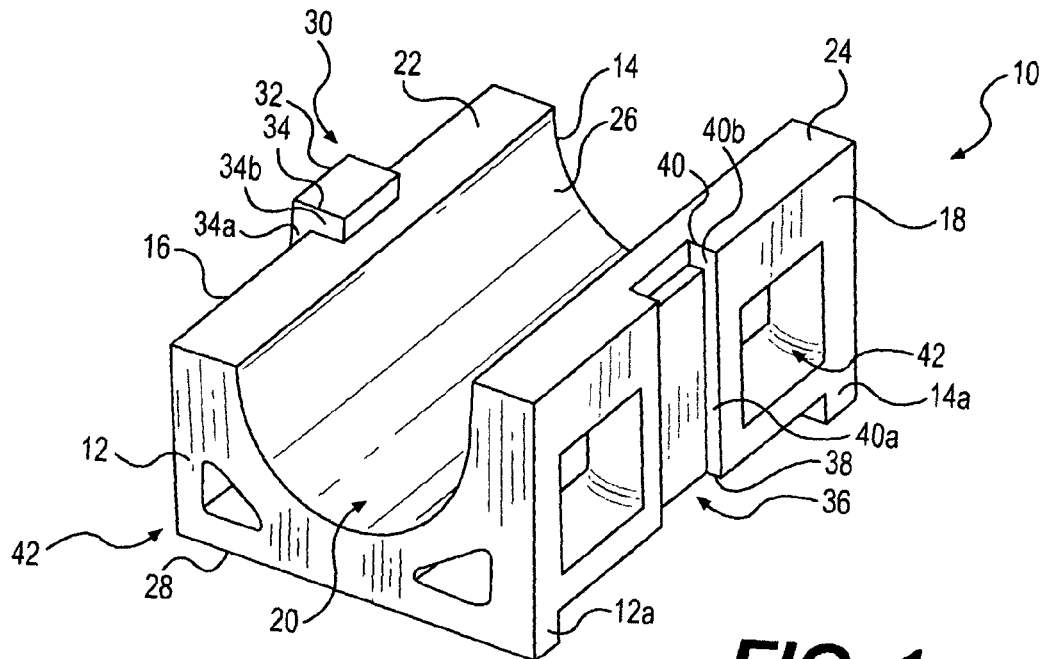
FIG. 1 is a diagrammatic illustration of an exemplary modular component of a conduit mounting system in accordance with the present disclosure.

FIG. 1 illustrates an exemplary modular component 10 of a conduit mounting system. Component 10 may include a first side 12 at a first transverse end of component 10 and a second side 14 at a second transverse end of component 10. First and second sides 12, 14 may be longitudinally spaced apart from one another and may be substantially parallel to one another. Component 10 may also include a third side 16 along a first longitudinal side of component 10 and a fourth side 18 along a second longitudinal side of component 10. Third and fourth sides 16, 18 may be axially spaced apart from one another and may be substantially parallel to one another. Each one of first and second sides 12, 14 may be disposed between third and fourth sides 16, 18 and each one of third and fourth sides 16, 18 may be disposed between first and second sides 12, 14. It is contemplated that first and second sides 12, 14 may each include a flange portion 12a, 14a.

Component 10 may also include a fifth side 20 extending along the same general longitudinal direction as third and fourth sides 16, 18. Fifth side 20 may be respectively disposed between first and second sides 12, 14 and between third and fourth sides 16, 18. Fifth side 20 may include a first portion 22 disposed adjacent third side 16 and a second portion 24 disposed adjacent fourth side 18. First and second portions 22, 24 may engage respective portions of another modular component substantially similar to component 10 as will be explained in more detail below with respect to FIG. 2. Fifth side 20 may also include a conduit supporting surface 26 disposed between first and second portions 22, 24. Supporting surface 26 may extend the full length of fifth side 20 and may be configured to engage an outer surface of a conduit. Supporting surface 26 may have an arcuate cross sectional shape so as to define a substantially half-cylindrical channel within component 10. It is contemplated that the cross sectional shape of surface 26 may, alternatively, be rectangular, triangular, or any other shape.

Component 10 may also include a sixth side 28 (see also FIG. 2) extending along the same general longitudinal direction as fifth side 20. Sixth side 28 may be respectively disposed between first and second sides 12, 14 and between third and fourth sides 16, 18. Sixth side 28 may include a plurality of projections 29, for example, pins, extending beyond a surface of sixth side 28. Projections 29 may have a substantially circular cross sectional shape (as shown). It is contemplated that the cross sectional shape of projections 29 may, alternatively be rectangular, triangular, or any other shape. As will be explained in more detail below, projections 29 may be received within respective openings of a clamp. Flange portions 12a, 14a of first and second sided 12, 14 may also extend beyond the surface of sixth side 28.

Component 10 may also include a flange 30. Flange 30 may be disposed along third side 16 and may extend beyond a surface thereof. Flange 30 may also extend beyond a surface of first portion 22 of fifth side 20. As such, flange 30 may protrude from both third side 16 and fifth side 20. Flange 30 may extend the full width of third side 16. That is, flange 30 may extend from fifth side 20 to sixth side 28 (see flange 30' in FIG. 2). Flange 30 may include a first axial dimension 32 generally aligned with third side 16 and a second axial dimension 34 generally aligned with first and second sides 12, 14. First axial dimension 32 may be substantially constant along the length of flange 30. Second axial dimension 34 may include first portion 34a, extending from sixth side 28 to fifth side 20 and a second portion 34b, extending beyond the surface of first portion 22. Second portion 34b may be larger than first portion 34a. As such, flange 30 may be substantially L-shaped (see flange 30' in FIG. 2).

Component 10 may also include a groove 36. Groove 36 may be disposed along fourth side 18 and may be formed therein. Groove 36 may also be formed within second portion 24 of fifth side 20. As such, groove 36 may be formed in both fourth and fifth sides 18, 20. Groove 36 may have a generally rectangular shape and may extend the full width of fourth side 18. That is, groove 36 may extend from sixth side 28 to fifth side 20. Groove 36 may include a first depth dimension 38 generally aligned with fourth side 18 and a second depth dimension 40 generally aligned with first and second sides 12, 14. First depth dimension 38 may be substantially constant from sixth side 28 to fifth side 20. Second depth dimension 40 may include a first portion 40a, extending along the majority of fourth side 18 from sixth side 28 to fifth side 20 and a second portion 40b, extending along the remainder of fourth side 18. Second portion 40b may be larger than first portion 40a. As such, groove 36 may be substantially L-shaped. As will be explained in more detail below, the flange of one modular component, for example, component 10, may be configured to fit within the respective grooves of two adjacent modular components.

Component 10 may also include a plurality of cutouts 42 formed in first, second, third, and fourth sides 12, 14, 16, 18 (only shown in first and fourth sides in FIG. 1). Cutouts 42 may be any suitable shape and may be configured to reduce the amount of material needed to form component 10. Component 10 may be made from any material such as, for example, nylon or other polymer, and may have sufficient natural rigidity to maintain the general shape of component 10 when stressed, and, at the same time, may be malleable enough to be deform when compressed. As such, component 10 may be configured to be compressed when an urging or clamping force, is applied. The compressibility of component 10 will be further explained below with reference to FIGS. 3 and 4. It is contemplated that component 10 may further be configured to dampen vibrations that resonate within a supported conduit and reduce the amount of such vibrations that are transferred via the conduit mounting system to a support structure.

Figure 2:
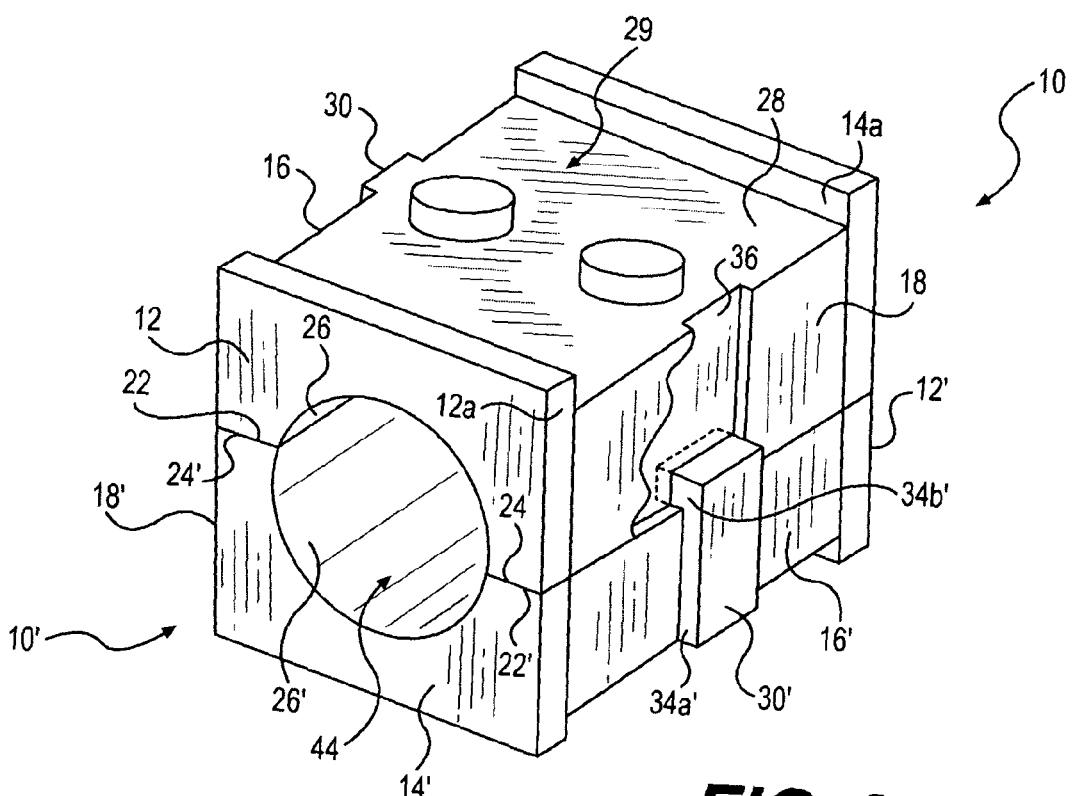
FIG. 2 is a diagrammatic illustration of an exemplary conduit mounting system including two exemplary modular components of FIG. 1.

FIG. 2 illustrates component 10, referred to as first component 10, interconnected with another exemplary modular component, second component 10'. Second component 10' may be substantially similar to first component 10 and, as such, is not further described. For clarification purposes, the elements of second component 10' have the same reference number as component 10 with the addition of a prime ('). For descriptive purposes, first component 10 is illustrated as the top component (as illustrated in FIG. 2), so as to show sixth side 28 and projections 29. Second component 10' is illustrated as the bottom component (as illustrated in FIG. 2), so as to further show flange 30'.

When first and second components 10, 10' are assembled, as illustrated in FIG. 2, flange 30 of first component 10 may be disposed within groove 36' of component 10' (not shown) and flange 30' of second component 10' may be disposed within groove 36 of first component 10. In addition, first and second portions 22, 24 of first component 10 may respectively contact second and first portions 24', 22' of second component 10'. Furthermore, support surfaces 26, 26' may be substantially aligned and facing one another to form a channel 44 through first and second components 10, 10'. Channel 44 may be configured to receive a conduit therein such that first and second components 10, 10' substantially surround the conduit.

Flange 30' may be sized such that first portion 34b' thereof fits within second portion 40b of groove 36 and yet extends beyond the surface of fourth side 18. That is, the difference between the dimensions of first and second portions 34a' and 34b' may be greater than the difference between the dimensions of first and second portions 40a and 40b. Accordingly, when first and second components 10, 10' are assembled as illustrated in FIG. 2, flange 30' may extend into groove 36 such that a portion of flange 30' extends beyond the surface of fourth side 18 of first component 10. It is contemplated that the dimension of the portion of flange 30' that extends beyond the surface of fourth side 18 of first component 10 may be substantially the same as the dimension of first portion 34a'.

FIGS. 3a and 3b illustrate a conduit mounting system comprising four modular components, for example, first, second, third, and fourth components 10, 10', 10", and 10''', and a clamp 50. Similar to second component 10', third and fourth components 10" and 10''' are substantially similar to first component 10 and, as such, are not further described. For clarification purposes, first and second components 10, 10' are assembled, similar to that shown in FIG. 2, with first component 10 on the top and second component 10' on the bottom. As such, the description set forth above with respect to FIG. 2 and the interconnection of flanges 30, 30' and grooves 36, 36' is equally applicable to the interconnection of first and second components 10, 10' and FIG. 3*a*. However, for clarification purposes, the flanges and grooves of first, second, third, and fourth components 10, 10', 10", and 10''' are not illustrated in FIG. 3*a* and are illustrated in cross section along view A-A in FIG. 3*b*.

With particular reference to FIG. 3*b*, when first, second, third, and fourth components 10, 10', 10", and 10''' are assembled, as illustrated in FIG. 3*a*, flange 30' of second component 10' may be disposed within groove 36 of first component 10. Additionally, flange 30" of third component 10" may also be disposed within groove 36 of first component 10. Groove 36 of first component 10 may be configured to receive the flanges of two adjacent components, for example, flanges 30', 30" of second and third components 10', 10" and, as such, first, second, and third components 10, 10', 10" may be interconnected with one another. Similarly, flanges 30', 30" of second and third components 10', 10" may be disposed within groove 36''' of fourth component 10'''. In addition, when first, second, third, and fourth components 10, 10', 10", and 10''' are assembled, flanges 30', 30" may be in contact with one another and grooves 36, 36''' may form a void (as indicated with bold lines in FIG. 3*b*.) to accommodate flanges 30', 30".

FIG. 3*a* also illustrates an exemplary clamp 50. Clamp 50 may be configured to fix one or more pairs of modular components, for example, first, second, third, and fourth modular components 10, 10', 10", 10''', to a support structure (not shown), for example, a machine frame or a building wall. Clamp 50 may include a first bar 52 having a substantially L-shape and configured to extend along two sides of an assembly of modular components. Clamp 50 may also include a second bar 54 having a substantially L-shape and configured to extend along two additional sides of an assembly of modular components. First and second bars 52, 54 may each be made from substantially flat bar stock and may include a plurality of apertures formed therein, for example, apertures 58 (as shown in first bar 52) configured to receive and accommodate projections 29 from one or more modular components. First and second bars 52, 54 may be sized to fit within flange portions 12*a*, 14*a* of first and second sides 12, 14. First and second bars 52, 54 may be selectively joined together at respective first ends at a hinge 56. Hinge 56 may include a slot, formed in second bar 54 and a tab, formed in first bar 52. The slot and the tab may have substantially complimentary shapes such that the tab may be inserted into the slot to selectively connected the respective first ends of first and second bars 52, 54 together. The operation of hinge 56 is well known in the art and, as such, is not further described.

First and second bars 52, 54 may also be selectively joined together at respective second ends, opposite hinge 56, via a bolt (not shown). First and second bars 52, 54 may each include bolt hole, for example, bolt hole 55 (as shown in first bar 52) that are respectively aligned with one another when first and second bars 52, 54 are selectively joined via hinge 56. It is contemplated that the bolt holes of first and second bars 54, 48 may be further aligned with a bolt hole (not shown) in the support structure to which the plurality of modular components are to be connected. As such, when first and second bars 52, 54 are arranged to surround a plurality of modular components such that the respective apertures receive projections 29 and the respective bolt holes are aligned, a bolt may be inserted within the bolt holes and tightened via a threaded hole or a nut with respect to the support structure to selectively fix the plurality of modular components thereto.

FIG. 4 illustrates another conduit mounting system comprising four mounting components 10, 10', 11, 11', as well as a first plurality of spacers 60 and a second plurality of spacers 70. As stated above, first and second components 10, 10' are substantially similar to one another. Fifth and sixth components 11, 11' are also substantially similar to first and second components 10, 10', however, they may be scaled by a ratio of approximately one-half. That is, fifth and sixth components 11, 11' may be substantially the same as first and second components 10, 10', but may be one-half their size. First and second pluralities of spacers 60, 70 may be interspaced among first, second, fifth, and sixth components 10, 10', 11, 11'as shown in FIG. 4. It is contemplated that any number and/or arrangement of first and second pluralities of spacers 60, 70 may be interspaced among any number of mounting components to fill in spaces and accommodate an arrangement of two-or more pairs of mounting components with or without differing size ratios. In addition, first and second pluralities of spacers 60, 70 may provide desired spacing between pairs of mounting components and/or one or more structures to accommodate particular arrangements of conduits.

First and second components 10, 10' interact substantially similar as described above with reference to FIGS. 2, 3*a*, and 3*b*. Fifth and sixth 11, 11' components interact with first and second components 10, 10' similar to third and fourth components 10", 10''' as described above with reference to FIGS. 3*a*, 3*b*. However, because fifth and sixth components 11, 11' are approximately one-half the size of first and second components 10, 10', fifth and sixth components 11, 11' may both be adjacent first component 10 instead of sixth component 11' being adjacent second component 10'.

FIG. 4 also illustrates another exemplary clamp 51. Clamp 51 may be configured to fix first, second, third, fourth, fifth, and sixth modular components 10, 10', 10", 10''', 11, 11', as well as first and second plurality of spacers 60, 70 to a support structure (not shown), for example, a machine frame or a building wall. Clamp 51 may include a first bar 51*a* disposed on a first side a plurality of modular components and may include a second bar 51*b* disposed on a second side of the plurality of modular components. First and second bars 51*a*, 51*b* may be sized to fit within flange portions of one or more of the plurality of modular components and spacers. Specifically, the width of first and second bars 51*a*, 51*b* may be sized to be approximately twice the size of the flanges of the plurality of modular components such that another arrangement of modular components and/or spacers may be positioned on top of (with respect to FIG. 4) a first arrangement of modular components. It is contemplated that in such an arrangement, a single bar of clamp 51 may be disposed between two adjacent arrangements of modular components. Clamp 51 may also include a plurality of apertures formed therein configured to receive and accommodate projections 29 from one or more modular components or a bolt, as will be described in more detail below with reference to FIG. 6.

Figure 5A:
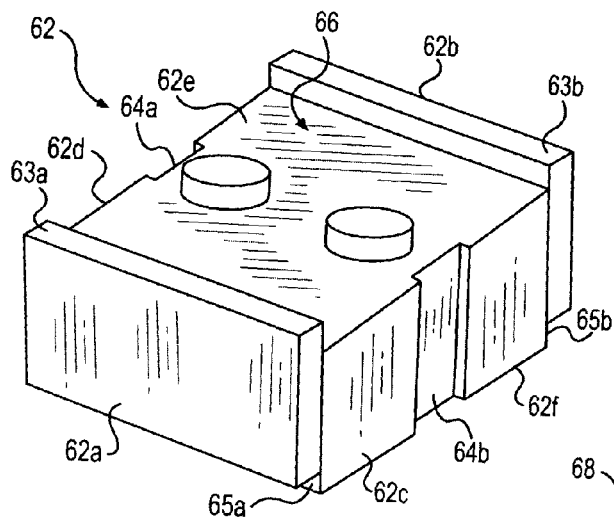
FIG. 5a is a diagrammatic illustration of a spacer of the conduit mounting system of FIG. 4.
Figure 5B:
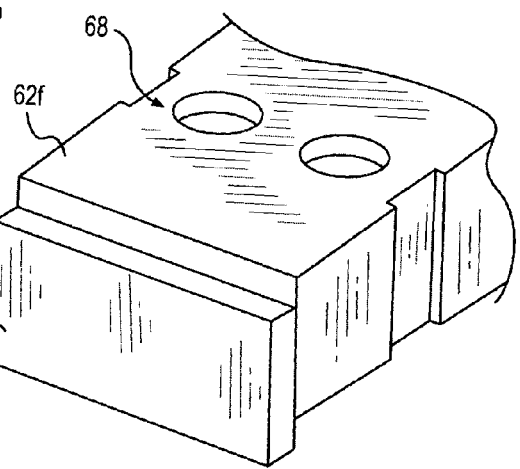

FIGS. 5*a* and 5*b* illustrate an exemplary first spacer 62. Spacer 62 may, similar to first component 10, include first, second, third, fourth, fifth, and sixth sides 62*a-f* and flange portions 63*a-b*. Spacer 62 may also include grooves 64*a-b* formed in both third and fourth sides 62*c-d* and may not include a flange. Grooves 64*a-b* may be similar to groove 36, but may have a substantially constant shape. That is, grooves 64*a-b* may not be L-shaped. In addition, spacer 62 may include additional groove portions 65*a-b*, formed on first and second sides 62*a-b*, opposite flange portions 63*a-b*, and may be substantially complimentary thereto. Grooves 65a-b may be configured to receive a respective flange portion of another spacer (see FIG. 4) or a mounting component, for example, sixth mounting component 11'. In addition, spacer 62 may include projections 66, similar to projections 29, formed on fifth side 62e thereof configured to interact with clamp 50. Spacer 62 may also include apertures 68 (see FIG. 5b), substantially complimentary to projections 66 of another spacer and/or substantially complimentary to projections 29 of a mounting component (see FIG. 4). It is contemplated that third and fourth sides 62c-d of spacer 62 may have substantially the same width, such that spacer 62 may be substantially symmetrical about its longitudinal axis. It is also contemplated that spacer 62 may be sized at any size ratio relative to first and second components 10, 10' and/or fifth and sixth components 11, 11'. It is further contemplated that spacer 62 may have a general shape substantially similar to first component 10

Figure 6:
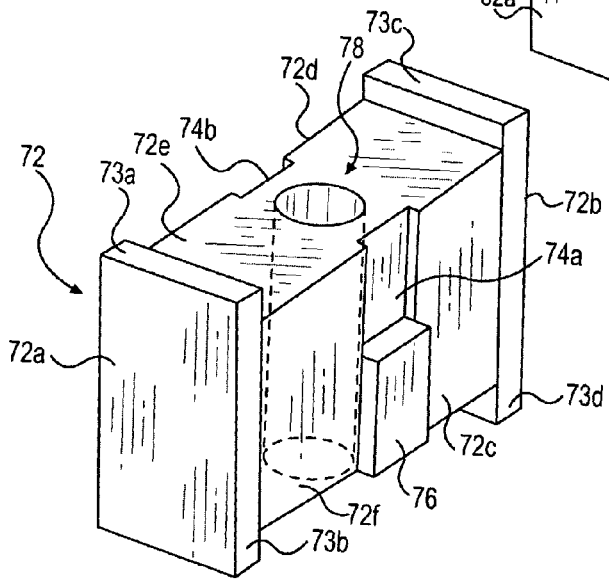
FIG. 6 is a diagrammatic illustration of another spacer of the conduit mounting system of FIG. 4.

FIG. 6 illustrates an exemplary second spacer 72. Spacer 72 may include first, second, third, fourth fifth, and sixth sides 72a-f. Spacer 72 may include a groove 74a and a flange 76 on third side 72c and may include only a groove 74b on fourth side 72d. First and second sides 70a-b may each include flange portions 73a-d formed at both ends thereof. Additionally, spacer 72 may include a through-hole 78 formed therein extending from fifth side 72e to sixth side 72f. Through-hole 78 may be configured to receive a bolt that may be inserted through an aperture in an associated clamp, for example, an aperture of clamp 51. As such, a particular arrangement of mounting components may be further secured to a structure via a bolt through spacer 72. It is contemplated that one or more spacers 72 may be positioned at any location within a plurality of mounting components. For example, spacers 72 may be positioned at the ends of an assembly, adjacent clamp 51 (see FIG. 4), and/or interspaced between one or more pairs of mounting components (not shown). It is also contemplated that the length of the flange on the third side of spacer 72 may be any length less than the length of first portion 40a (see FIG. 1). It is further contemplated that a sleeve made from a metal or other material may be inserted within through-hole 78. Such a sleeve may sized to control or limit the tightening of an associated bolt and, thus, may limit or control the amount of compression transferred from a clamp to an associated assembly of modular components and spacers.

INDUSTRIAL APPLICABILITY

The disclosed system may be applicable to mount any conduit and may have increased structural integrity. Mounting component 10 and, in particular, a conduit mounting system comprising a plurality of mounting components, is described below.

A particular number and arrangement of conduits may be desired to be mounted to a particular structure, for example, a plurality of hydraulic hoses may be desired to be mounted to a machine frame. As such, depending upon the size and number of hoses, a plurality of mounting components, for example, one or more mounting components may be arranged with one another and/or a plurality of spacers. A clamp may engage one or more of the plurality of mounting components and spacers to secure them to the machine frame via one or more bolts. Bolts may be secured through bolt holes within the clamp and/or through one or more through-holes formed within one or more of the plurality of spacers. As the respective bolts are tightened, the clamp and may compress one or more of the plurality of mounting components, which may in turn compress against the one or more hydraulic hoses. The assembly may be disconnected by loosening and removing the one or more bolts and disconnecting the clamp. This disassembly may easily facilitate replacing one or more damaged or worn mounting components and/or modifying a particular arrangement to include more or less mounting components. e same, a modular conduit mounting system with improved interlocking between the modular components may be provided. Additionally, because each of the mounting components may be modular, scalable, and can be interspaced with space Because the flange of one mounting component interconnects with two adjacent mounting blocks, an assembly of two or more mounting blocks may be more securely secured to one another as compared to flanges that are oriented in only a single direction. Because each of the mounting components are substantially th rs, a variety of different sizes and/or arrangements of conduits may be accommodated. Furthermore, an assembled plurality of components may not require a complex clamping arrangement and may easily be disassembled.

What is claimed is:

1. A conduit mounting system comprising a plurality of modular components, each modular component including:
   first and second transverse sides spaced apart and substantially parallel with one another;
   third and fourth longitudinal sides spaced apart and substantially parallel with one another, the third and fourth longitudinal sides extending between the first and second transverse sides;
   a fifth side disposed between the first and second transverse sides and between the third and fourth longitudinal sides, the fifth side including a conduit support surface disposed between first and second side contact portions, and extending from the first transverse side to the second transverse side;
   a flange having a first flange portion extending beyond a surface of the third longitudinal side and a second flange portion extending beyond a surface of the first side contact portion of the fifth side; and
   a groove having a first groove portion formed in the fourth longitudinal side and a second groove portion formed in the second side contact portion of the fifth side, wherein the plurality of modular components includes a first component and a second component, the system further including an assembled state wherein the second flange portion of the first component is disposed within the second groove portion of the second component and the second flange portion of the second component is disposed within the second groove portion of the first component.

2. The system of claim 1, wherein the conduit support surfaces of the first and second components are axially aligned with one another and form a substantially cylindrical opening.

3. The system of claim 1, wherein each of the plurality of modular components further include a sixth side disposed between the first and second transverse sides and between the third and fourth longitudinal sides, the sixth side includes a plurality of projections extending from a surface of the sixth side, and the system further comprises a clamp including a plurality of openings formed therein, each opening having a shape substantially complementary to one of the plurality of projections extending from the surface of a sixth side of one of the plurality of modular components.

4. The system of claim 1, wherein the plurality of modular components further includes a third component, and a fourth component, the system further including an assembled state wherein:
the first flange portion of the second component is disposed within the first groove portion of the fourth component and the first flange portion of the third component is disposed within the first groove portion of the first component.

5. The system of claim 4, wherein:
the conduit support surfaces of the first and second components are axially aligned with one another and form a first substantially cylindrical opening; and
the conduit support surfaces of the third and fourth components are axially aligned with one another and form a second substantially cylindrical opening.

6. The system of claim 1, wherein:
the flange is an only projection extending from the third longitudinal side and the fifth side; and
the groove is an only recess formed within the fourth longitudinal side and the fifth side.

7. The system of claim 1, further including a sixth side disposed between the first and second transverse sides and between the third and fourth longitudinal sides, wherein:
a longitudinal length of each of the third and fourth longitudinal sides, between the first and second transverse sides, is substantially the same; and
a height of the third longitudinal side, between the fifth and sixth sides, is less than a height of the fourth longitudinal side, between the fifth and sixth sides.

8. The system of claim 1, wherein each of the plurality of components is further configured to be interconnected with remaining ones of the plurality of components such that the fifth side of each component is configured to be positioned to face a fifth side of at least one other component, and the fourth side of each component is configured to be positioned to face a third side of at least one other component.

9. A conduit mounting system, comprising:
a first modular component including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a flange extending beyond a surface of the third side and a surface of the fifth side, and a groove formed within the fourth side and the fifth side;
a second modular component including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a flange extending beyond a surface of the third side and a surface of the fifth side, and a groove formed within the fourth side and the fifth side, the second modular component disposed adjacent the first modular component such that at least a portion of the flange of the first modular component is disposed at least partially within the groove of the second modular component and the first and second contact surfaces of the fifth side of the first modular component respectively engage the first and second contact surfaces of the fifth side of the second modular component; and
a first channel formed between the first and second modular components, the first channel being defined by the conduit support surface disposed in the fifth side of the first modular component and the conduit support surface disposed in the fifth side of the second modular component, and the first channel including a first end at the first side of the first modular component, a second end at the second side of the first modular component, and a closed sidewall between the first and second ends.

10. The system of claim 9, further including third and fourth modular components, each including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a flange extending beyond a surface of the third side and a surface of the fifth side, and a groove formed within the fourth side and the fifth side, wherein:
the third modular component is disposed adjacent the first and fourth modular components such that at least a portion of the flange of the third modular component is disposed at least partially within the groove of the first modular component and a recess of the fourth modular component; and
the fourth modular component is disposed adjacent the second and third modular components such that at least a portion of the flange of the fourth modular component is disposed at least partially within the groove of the third modular component and the flange of the second modular component is disposed at least partially within the groove of the fourth modular component.

11. The system of claim 10, further including a second channel formed between the third and fourth modular components, the second channel being defined by the conduit support surface disposed in the fifth side of the third modular component and the support surface disposed in the fifth side of the fourth modular component.

12. The system of claim 11, wherein the first and second channels each define a substantially cylindrical opening.

13. The system of claim 9, further including third and fourth modular components, each including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a flange extending beyond a surface of the third side and a surface of the fifth side, and a groove formed within the fourth side and the fifth side and having a scaled size ratio with respect to the first and second modular components of approximately one-half, wherein the third and fourth modular components are each disposed adjacent the first modular component such that at least a portion of the flange of the third modular component is disposed at least partially within the groove of the first modular component and the groove of the fourth modular component.

14. The system of claim 9, further including a clamp at least partially surrounding the first and second modular components.

15. The system of claim 9, wherein:
each of the flanges of the first and second modular components are substantially L-shaped; and
each of the grooves of the first and second modular components are substantially L-shaped.

16. The system of claim 9, further including:
third and fourth modular components, each including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a flange extending beyond a surface of the third side and a surface of the fifth side, and a groove formed within the fourth side and the fifth side; and
a plurality of spacers interspaced among the first, second, third, and fourth modular components, each of the spacers being void of a conduit support surface.

17. A conduit mounting system, comprising:
a first modular component including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a substantially L-shaped flange extending beyond a surface of the third side and a surface of the fifth side, and a substantially L-shaped groove formed within the fourth side and the fifth side;
a second modular component including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a substantially L-shaped flange extending beyond a surface of the third side and a surface of the fifth side, and a substantially L-shaped groove formed within the fourth side and the fifth side, the second modular component being disposed adjacent the first modular component such that at least a portion of the flange of the first modular component is disposed at least partially within the groove of the second modular component;
a third modular component including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a substantially L-shaped flange extending beyond a surface of the third side and a surface of the fifth side, and a substantially L-shaped groove formed within the fourth side and the fifth side, the third modular component being disposed adjacent the first modular component such that at least a portion of the flange of the third modular component is disposed within the groove of the first modular component; and
a fourth modular component including first and second sides axially separated and substantially parallel with one another, third and fourth sides disposed between the first and second sides and being axially separated and substantially parallel with one another, a fifth side disposed between the first, second, third, and fourth sides and including a conduit support surface disposed therein between first and second contact surfaces, a substantially L-shaped flange extending beyond a surface of the third side and a surface of the fifth side, and a substantially L-shaped groove formed within the fourth side and the fifth side, the fourth modular component being disposed adjacent the second modular component such that at least a portion of the flange of the second modular component is disposed within the groove of the fourth modular component.

18. The system of claim 17, wherein a portion of the flange of the second modular component engages the flange of the third modular component.

19. The system of claim 17, wherein the groove of the first modular component and the groove of the fourth modular component interact with one another and form a void sized to accommodate the flanges of second and third modular components.

* * * * *